United States Patent
Nawata et al.

(10) Patent No.: US 8,972,148 B2
(45) Date of Patent: Mar. 3, 2015

(54) VEHICLE, METHOD AND DEVICE FOR CONTROLLING ENGINE

(75) Inventors: Hidekazu Nawata, Susono (JP);
Shunsuke Fushiki, Susono (JP);
Makoto Yamazaki, Gotenba (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 140 days.

(21) Appl. No.: 13/515,361

(22) PCT Filed: Mar. 30, 2011

(86) PCT No.: PCT/JP2011/058038
§ 371 (c)(1),
(2), (4) Date: Jun. 12, 2012

(87) PCT Pub. No.: WO2012/131941
PCT Pub. Date: Oct. 4, 2012

(65) Prior Publication Data
US 2012/0310458 A1 Dec. 6, 2012

(51) Int. Cl.
*G06F 19/00* (2011.01)
*B60K 6/20* (2007.10)
(Continued)

(52) U.S. Cl.
CPC .............. *B60K 6/445* (2013.01); *B60W 10/06* (2013.01); *B60W 10/08* (2013.01); *B60W 10/30* (2013.01); *B60W 20/00* (2013.01); *B60W 20/106* (2013.01); *B60W 2510/0676* (2013.01);
(Continued)

(58) Field of Classification Search
CPC ...... B60K 6/445; B60W 10/06; B60W 10/08;
B60W 10/30; B60W 20/00; B60W 20/106;
B60W 2510/676; B60W 2510/244; B60W
2710/0694; B60W 2710/244; Y02T 10/54;
Y02T 10/6286; Y02T 10/6239
USPC .................... 701/22, 99, 101, 113; 180/65.21
See application file for complete search history.

(56) References Cited

U.S. PATENT DOCUMENTS 7,869,932 B2 * 1/2011 Boesch .......................... 701/112
2008/0275601 A1 * 11/2008 Saito et al. ....................... 701/22
(Continued)

FOREIGN PATENT DOCUMENTS

| | | | |
|---|---|---|---|
| JP | 2010-188935 A | 9/2010 | |
| JP | 2010-188936 A | 9/2010 | |

(Continued)

OTHER PUBLICATIONS

International Search Report for PCT/JP2011/058038 dated Apr. 26, 2011.

*Primary Examiner* — Fadey Jabr
*Assistant Examiner* — Thomas Ingram
(74) *Attorney, Agent, or Firm* — Sughrue Mion, PLLC

(57) ABSTRACT

A vehicle provided with a motor generator as a driving source includes a battery to supply electric power to the motor generator, an engine, and an ECU to control the vehicle in one of a CS mode and a CD mode in which opportunity for operation of the engine is limited compared to in the CS mode. The ECU controls the engine in accordance with a condition different from a condition used to control the engine in the CS mode, if the engine is started at least due to decrease in a state of charge of the battery while the vehicle is controlled in the CD mode.

9 Claims, 11 Drawing Sheets

(51) Int. Cl.
- *B60K 6/445* (2007.10)
- *B60W 10/06* (2006.01)
- *B60W 10/08* (2006.01)
- *B60W 10/30* (2006.01)
- *B60W 20/00* (2006.01)

(52) U.S. Cl.
CPC . *B60W 2510/244* (2013.01); *B60W 2710/0694* (2013.01); *Y02T 10/54* (2013.01); *Y02T 10/6286* (2013.01); *Y02T 10/6239* (2013.01); *Y10S 903/902* (2013.01); *Y10S 903/93* (2013.01)
USPC .......... 701/99; 701/101; 701/113; 180/65.21; 903/902; 903/930

(56) References Cited

U.S. PATENT DOCUMENTS

| | | | |
|---|---|---|---|
| 2009/0314255 A1* | 12/2009 | Boesch | 123/339.24 |
| 2010/0044131 A1 | 2/2010 | Teraya | |
| 2010/0058737 A1* | 3/2010 | Harada et al. | 60/273 |
| 2010/0082188 A1* | 4/2010 | Ando | 701/22 |
| 2010/0107608 A1* | 5/2010 | Mitsutani | 60/285 |
| 2010/0204864 A1* | 8/2010 | Ando et al. | 701/22 |
| 2010/0276223 A1* | 11/2010 | Gonze | 180/309 |
| 2010/0280737 A1* | 11/2010 | Ewert et al. | 701/102 |
| 2011/0066308 A1* | 3/2011 | Yang et al. | 701/22 |
| 2011/0120789 A1* | 5/2011 | Teraya | 180/65.25 |
| 2011/0202223 A1* | 8/2011 | Nefcy et al. | 701/22 |
| 2011/0288713 A1* | 11/2011 | Pursifull et al. | 701/22 |
| 2012/0031079 A1* | 2/2012 | Spicer et al. | 60/278 |
| 2012/0035795 A1* | 2/2012 | Yu et al. | 701/22 |
| 2012/0065819 A1* | 3/2012 | Christman et al. | 701/22 |
| 2012/0072061 A1* | 3/2012 | Kim | 701/22 |
| 2013/0304291 A1 | 11/2013 | Nawata et al. | |

FOREIGN PATENT DOCUMENTS

| | | |
|---|---|---|
| JP | 2010-280379 A | 12/2010 |
| JP | 2011-51395 A | 3/2011 |
| WO | 2011024038 A2 | 3/2011 |

\* cited by examiner

VEHICLE, METHOD AND DEVICE FOR CONTROLLING ENGINE

CROSS REFERENCE TO RELATED APPLICATIONS

This application is a National Stage of International Application No. PCT/JP2011/058038 filed Mar. 30, 2011, the contents of which are incorporated herein by reference in their entirety.

TECHNICAL FIELD

The present invention relates to a vehicle, a method and a device for controlling an engine, and more particularly to a technique of controlling an engine when the engine is started at least due to decrease in a state of charge of a power storage device.

BACKGROUND ART

A hybrid vehicle incorporating an engine and an electric motor as a driving source is known. The hybrid vehicle has a power storage device such as a battery to store electric power to be supplied to the electric motor. The battery is charged with electric power generated by a power generator driven by the engine, electric power regenerated with the electric motor during deceleration of the vehicle, and the like.

Such hybrid vehicle can run using either one or both of the engine and the electric motor as a driving source depending on an operating state and the like of the vehicle. Thus, when an accelerator pedal position is small, for example, the engine is stopped, and the vehicle can run using only the electric motor as a driving source. When sudden acceleration is required, on the other hand, the engine is driven in order to obtain desired acceleration.

A running state where the engine is stopped and only the electric motor is used as a driving source involves no exhaust gas emissions, thus imposing only a small environmental load. In a hybrid vehicle, however, stopping and starting of an engine may be repeated as described above. As a result, the engine may be stopped before the completion of warm-up of the engine, which may result in frequent restart of the engine before the completion of warm-up. As is well known, when an engine is started before the completion of warm-up, a relatively high amount of HC or CO may be exhausted.

In view of such problem, Japanese Patent Laying-Open No. 2010-188935 (PTL 1) proposes to warm up an internal combustion engine until the temperature of a catalyst reaches a first temperature while an electric run preference mode is set, and warm up the internal combustion engine until the temperature reaches a second temperature lower than the first temperature while a hybrid run preference mode is set.

CITATION LIST

Patent Literature

PTL 1: Japanese Patent Laying-Open No. 2010-188935

SUMMARY OF INVENTION

Technical Problem

In Japanese Patent Laying-Open No. 2010-188935, when an engine is started upon switching of a control mode from the electric run preference mode to the hybrid run preference mode due to decrease in a state of charge (SOC) of a battery while the vehicle runs in the electric run preference mode, for example, assistance of an electric motor may be limited due to the low state of charge of the battery. For the vehicle to run while satisfying the demands of a driver, therefore, an engine output may be relatively increased, or engine operation may be continued for a relatively long period of time.

In this situation, if the catalyst is warmed up only to the temperature lower than that in the electric run preference mode by selecting the hybrid run preference mode, as described in Japanese Patent Laying-Open No. 2010-188935, purification of exhaust gas may be difficult.

An object of the present invention is to reduce unpurified components contained in exhaust gas.

Solution to Problem

In one embodiment, a vehicle provided with an electric motor as a driving source includes a power storage device to supply electric power to the electric motor, an engine, and a control unit to control the vehicle in one of a first control mode and a second control mode in which opportunity for operation of the engine is limited compared to in the first control mode. The control unit controls the engine in accordance with a condition different from a condition used to control the engine in the first control mode, if the engine is started at least due to decrease in a state of charge of the power storage device while the vehicle is controlled in the second control mode.

According to this embodiment, when the state of charge of the power storage device is low, the engine is controlled in a manner different from a manner in which the engine is controlled in the first control mode where opportunity for operation of the engine is increased. Thus, in a situation where assistance of the electric motor may be limited and a large engine output or engine operation for a long period of time may be required, the temperature of a catalyst is prevented from remaining low, and the temperature of coolant of the engine is prevented from remaining low. Therefore, the catalyst can perform the warm-up function sufficiently, and a favorable combustion state can be obtained when restarting the engine. As a result, unpurified components contained in exhaust gas can be reduced.

In another embodiment, the vehicle further includes a catalyst to purify gas exhausted from the engine. The control unit warms up the catalyst until a temperature of the catalyst attains a first value in the first control mode, and warms up the catalyst until the temperature of the catalyst attains a second value higher than the first value if the engine is started at least due to the decrease in the state of charge of the power storage device while the vehicle is controlled in the second control mode.

According to this embodiment, the temperature of the catalyst is increased so that the catalyst can perform the warm-up function sufficiently.

In yet another embodiment, the control unit stops the engine with a temperature of coolant of the engine being higher than a first value in the first control mode, and stops the engine with the temperature of the coolant of the engine being higher than a second value higher than the first value, if the engine is started at least due to the decrease in the state of charge of the power storage device while the vehicle is controlled in the second control mode.

According to this embodiment, the temperature of the coolant of the engine is increased so that a favorable combustion state can be obtained when restarting the engine after stopping the engine.

In yet another embodiment, the control unit controls the engine in accordance with the condition different from the condition used to control the engine in the first control mode, if the control unit has controlled the vehicle in the second control mode since a point in time when the control unit was activated, and the engine is started at least due to the decrease in the state of charge of the power storage device while the vehicle is controlled in the second control mode.

According to this embodiment, when the engine is started with the temperature of the catalyst or the temperature of the coolant of the engine being low because there were few opportunities for operation of the engine, the engine is controlled in a manner different from a manner in which the engine is controlled in the first control mode where opportunity for operation of the engine is increased. Thus, the temperature of the catalyst is prevented from remaining low, and the temperature of the coolant of the engine is prevented from remaining low. Therefore, the catalyst can perform the warm-up function sufficiently, and a favorable combustion state in the engine can be obtained.

In yet another embodiment, the control unit turns a flag on when the vehicle has been controlled in the second control mode since a point in time when the control unit was activated, and controls the engine in accordance with the condition different from the condition used to control the engine in the first control mode if the engine is started with the flag being ON.

According to this embodiment, when the engine is started with the temperature of the catalyst or the temperature of the coolant of the engine being low because there were few opportunities for activation of the engine, the engine is controlled in a manner different from a manner in which the engine is controlled in the first control mode where opportunity for operation of the engine is increased. Thus, the temperature of the catalyst is prevented from remaining low, and the temperature of the coolant of the engine is prevented from remaining low. Therefore, the catalyst can perform the warm-up function sufficiently, and a favorable combustion state in the engine can be obtained.

In yet another embodiment, the control unit controls the vehicle in the first control mode when the state of charge of the power storage device is lower than a threshold value, and controls the vehicle in the second control mode when the state of charge of the power storage device is equal to or higher than the threshold value.

According to this embodiment, opportunity for operation of the engine is increased when the state of charge of the power storage device is low.

In yet another embodiment, the control unit determines a parameter of the vehicle in accordance with operation by a driver, stops the engine when the parameter is smaller than a predetermined first value and operates the engine when the parameter is equal to or greater than the first value in the first control mode, and stops the engine when the parameter is smaller than a second value greater than the first value and operates the engine when the parameter is equal to or greater than the second value in the second control mode.

According to this embodiment, the engine can be stopped in both of the first control mode and the second control mode. When the engine is stopped, the amount of exhaust gas exhausted during running of the vehicle is reduced. If necessary, the engine can be operated to satisfy the demands of a driver regarding the running performance of the vehicle.

In yet another embodiment, the parameter is power.

According to this embodiment, the engine can be stopped and operated based on the power.

Advantageous Effects of Invention

When the state of charge of the power storage device is low, the engine is controlled in a manner different from a manner in which the engine is controlled in the first control mode where opportunity for operation of the engine is increased. Thus, in a situation where assistance of the electric motor may be limited and a large engine output or engine operation for a long period of time may be required, the temperature of the catalyst is prevented from remaining low, and the temperature of the coolant of the engine is prevented from remaining low. Therefore, the catalyst can perform the warm-up function sufficiently, and a favorable combustion state in the engine can be obtained. As a result, unpurified components contained in exhaust gas can be reduced.

DESCRIPTION OF EMBODIMENTS

Figure 1:
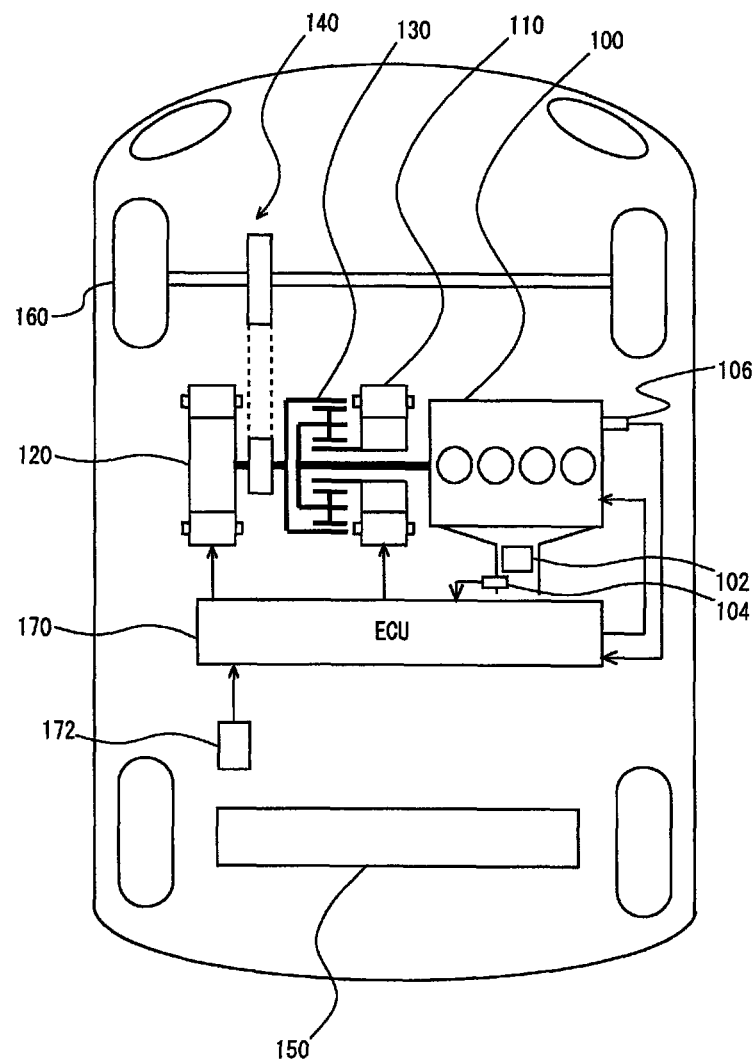
FIG. 1 is a schematic structural diagram illustrating a plug-in hybrid vehicle.
Figure 2:
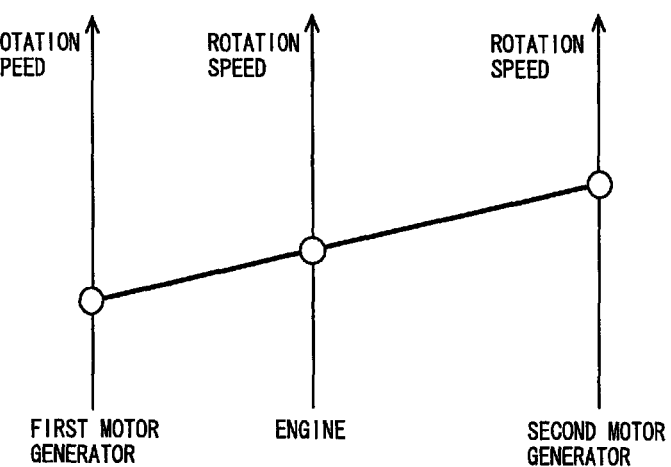
FIG. 2 is a nomographic chart of a power split device.

The embodiments of the present invention will be hereinafter described with reference to the drawings, in which the same components are designated by the same reference characters. Names and functions thereof are the same, and therefore, description thereof will not be repeated.

Referring to FIG. 1, a plug-in hybrid vehicle includes an engine 100, a first motor generator 110, a second motor generator 120, a power split device 130, a reduction gear 140, and a battery 150. While a plug-in hybrid vehicle will be described by way of example in the following description, a hybrid vehicle without a function of being charged by an external power supply may be employed instead of the plug-in hybrid vehicle.

Engine 100, first motor generator 110, second motor generator 120, and battery 150 are controlled by an ECU (Electronic Control Unit) 170. ECU 170 may be divided into a plurality of ECUs.

This vehicle runs with a driving force from at least one of engine 100 and second motor generator 120. That is, either one or both of engine 100 and second motor generator 120 are automatically selected as a driving force depending on an operating state.

When an accelerator pedal position is small and when vehicle speed is low, for example, the plug-in hybrid vehicle runs with only second motor generator 120 as a driving source. In this case, engine 100 is stopped. Engine 100, however, may be driven for power generation or the like.

When the accelerator pedal position is great, when the vehicle speed is high, and when a state of charge (SOC) of battery 150 is low, for example, engine 100 is driven. In this case, the plug-in hybrid vehicle runs with only engine 100, or both of engine 100 and second motor generator 120, as a driving source.

Engine 100 may be used not as a driving source for running, but only for power generation. That is, the hybrid vehicle may be a series hybrid vehicle.

Further, this vehicle is controlled either in a CS (Charge Sustaining) mode or in a CD (Charge Depleting) mode as a control mode. The control mode may be manually selected by a driver operating a switch 172. The control mode may be automatically switched between the CS mode and the CD mode.

In the CS mode, the plug-in hybrid vehicle runs while maintaining electric power stored in battery 150 to have a prescribed target value.

In the CD mode, the plug-in hybrid vehicle runs with electric power mainly only by a driving force from second motor generator 120, without maintaining the electric power stored in battery 150 for running. In the CD mode, however, when the accelerator pedal position is great and when the vehicle speed is high, for example, engine 100 may be driven to supplement the driving force.

The CS mode may also be referred to as HV mode. Likewise, the CD mode may also be referred to as EV mode. The CS mode and the CD mode will be described later in further detail.

Engine 100 is an internal combustion engine. A crankshaft serving as an output shaft rotates by combustion of an air-fuel mixture in a combustion chamber. Exhaust gas exhausted from engine 100 is purified by a catalyst 102, and then exhausted outside the vehicle. Catalyst 102 performs the purifying function by being increased in temperature to a prescribed activating temperature. A warm-up of catalyst 102 is performed with the heat of exhaust gas. Catalyst 102 is a three-way catalyst, for example.

From the exhaust gas, an air-fuel ratio of engine 100 is detected by an air-fuel ratio sensor 104. The temperature of coolant of engine 100 is detected by a temperature sensor 106. An output from air-fuel ratio sensor 104 and an output from temperature sensor 106 are input to ECU 170.

Engine 100, first motor generator 110 and second motor generator 120 are connected to one another via power split device 130. Mechanical power generated by engine 100 is split for two paths by power split device 130. One of them is a path for driving front wheels 160 via reduction gear 140. The other is a path for driving first motor generator 110 to generate power.

First motor generator 110 is a three-phase alternating-current rotating electric machine including a U-phase coil, a V-phase coil and a W-phase coil. First motor generator 110 generates power from mechanical power generated by engine 100 and split by power split device 130. The electric power generated by first motor generator 110 is used depending on a running state of the vehicle, and a state of charge of battery 150. For example, during normal running, the electric power generated by first motor generator 110 is used directly as electric power for driving second motor generator 120. On the other hand, when the SOC of battery 150 is lower than a predetermined value, the electric power generated by first motor generator 110 is converted from alternating-current power to direct-current power by an inverter to be described later. Then, the electric power is adjusted in voltage by a converter to be described later, and stored in battery 150.

When first motor generator 110 acts as a power generator, first motor generator 110 generates negative torque. The negative torque as used herein refers to torque that will serve as a load on engine 100. When first motor generator 110 acts as a motor with electric power supplied from first motor generator 110, first motor generator 110 generates positive torque. The positive torque as used herein refers to torque that will not serve as a load on engine 100, i.e., torque that will assist the rotation of engine 100. The same applies to second motor generator 120.

Second motor generator 120 is a three-phase alternating-current rotating electric machine including a U-phase coil, a V-phase coil and a W-phase coil. Second motor generator 120 is driven by at least one of the electric power stored in battery 150 and the electric power generated by first motor generator 110.

A driving force from second motor generator 120 is transmitted to front wheels 160 via reduction gear 140. Second motor generator 120 thus assists engine 100, and causes the vehicle to run by the driving force from second motor generator 120. Rear wheels may be driven instead of or in addition to front wheels 160.

During regenerative braking of the plug-in hybrid vehicle, second motor generator 120 is driven by front wheels 160 via reduction gear 140, and second motor generator 120 operates as a power generator. Second motor generator 120 thus operates as a regenerative brake for converting braking energy to electric power. The electric power generated by second motor generator 120 is stored in battery 150.

Power split device 130 is formed of a planetary gear including a sun gear, a pinion gear, a carrier, and a ring gear. The pinion gear engages with the sun gear and the ring gear. The carrier supports the pinion gear in such a manner that allows rotation of the pinion gear. The sun gear is coupled to a rotating shaft of first motor generator 110. The carrier is coupled to the crankshaft of engine 100. The ring gear is coupled to a rotating shaft of second motor generator 120 and reduction gear 140.

Figure 3:
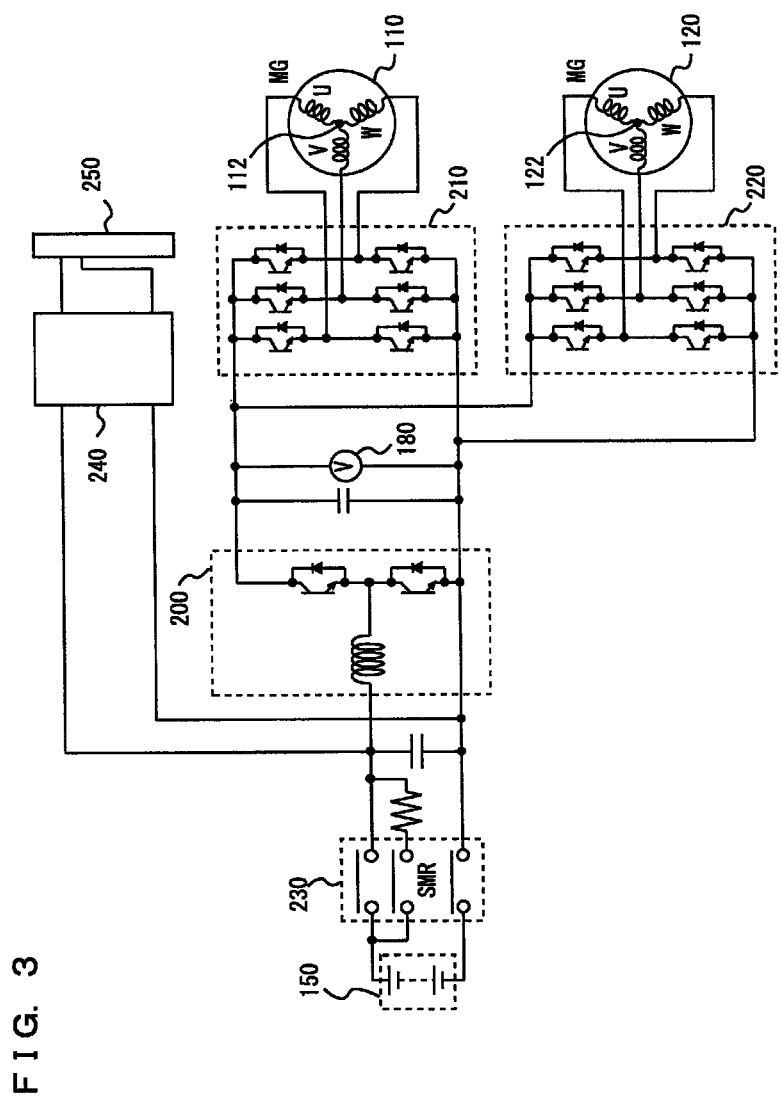
FIG. 3 is a (first) diagram illustrating an electric system of the plug-in hybrid vehicle.

Since engine 100, first motor generator 110 and second motor generator 120 are coupled to one another via power split device 130 formed of the planetary gear, the rotation speeds of engine 100, first motor generator 110 and second motor generator 120 are in such a relation that they are connected by a straight line in a nomographic chart as shown in FIG. 3.

Referring back to FIG. 1, battery stack 150 serves as a battery set having a configuration in which a plurality of battery modules each having a plurality of battery cells integrated with each other are connected in series. Battery 150 has a voltage of about 200 V, for example. Battery 150 is charged with the electric power supplied from first motor generator 110 and second motor generator 120, as well as from a power supply outside the vehicle. A capacitor may be used instead of or in addition to battery 150.

Referring to FIG. 3, the electric system of the plug-in hybrid vehicle will be described further. The plug-in hybrid vehicle is provided with a converter 200, a first inverter 210, a second inverter 220, an SMR (System Main Relay) 230, a charger 240, and an inlet 250.

Converter 200 includes a reactor, two npn-type transistors, and two diodes. The reactor has its one end connected to the positive terminal side of each battery, and the other end connected to a connection point between the two npn-type transistors.

The two npn-type transistors are connected in series. The npn-type transistors are controlled by ECU 170. Diodes are respectively connected between the collector and the emitter of the respective npn-type transistors to allow a current flow from the emitter to the collector.

The npn-type transistors may be implemented by IGBTs (Insulated Gate Bipolar Transistors), for example. Instead of the npn-type transistors, power switching elements such as power MOSFETs (Metal Oxide Semiconductor Field-Effect Transistors) can be used.

When electric power discharged from battery 150 is supplied to first motor generator 110 or second motor generator 120, converter 200 boosts the voltage. In contrast, when electric power generated by first motor generator 110 or second motor generator 120 is charged into battery 150, converter 200 down-converts the voltage.

A system voltage VH between converter 200 and the respective inverters is detected by a voltage sensor 180. The detection result from voltage sensor 180 is sent to ECU 170.

First inverter 210 includes a U-phase aim, a V-phase arm and a W-phase arm. The U-phase acus, V-phase arm and W-phase arm are connected in parallel. Each of the U-phase arm, V-phase arm and W-phase arm has two npn-type transistors connected in series. Diodes are respectively connected between the collector and the emitter of the respective npn-type transistors to allow a current flow from the emitter to the collector. A connection point of the npn-type transistors in each arm is connected to an end of each coil of first motor generator 110 other than a neutral point 112.

First inverter 210 converts a direct current supplied from battery 150 into an alternating current for supply to first motor generator 110. First inverter 210 also converts an alternating current generated by first motor generator 110 into a direct current.

Second inverter 220 includes a U-phase arm, a V-phase arm and a W-phase arm. The U-phase acus, V-phase aim and W-phase arm are connected in parallel. Each of the U-phase arm, V-phase arm and W-phase arm has two npn-type transistors connected in series. Diodes are respectively connected between the collector and the emitter of the respective npn-type transistors to allow a current flow from the emitter to the collector. A connection point of the npn-type transistors in each arm is connected to an end of each coil of second motor generator 120 other than a neutral point 122.

Second inverter 220 converts a direct current supplied from battery 150 into an alternating current for supply to second motor generator 120. Second inverter 220 also converts an alternating current generated by second motor generator 120 into a direct current.

Converter 200, first inverter 210 and second inverter 220 are controlled by ECU 170.

SMR 230 is provided between battery 150 and charger 240. SMR 230 is a relay for switching between a state where battery 150 and the electrical system are connected to each other and a state where they are disconnected from each other. When SMR 230 is opened, battery 150 is disconnected from the electrical system. When SMR 230 is closed, battery 150 is connected to the electrical system.

Namely, when SMR 230 is opened, battery 150 is electrically disconnected from converter 200, charger 240 and the like. When SMR 230 is closed, battery 150 is electrically connected to converter 200, charger 240 and the like.

The state of SMR 230 is controlled by ECU 170. For example, when ECU 170 is activated, SMR 230 is closed. When ECU 170 stops, SMR 230 is opened.

Figure 4:
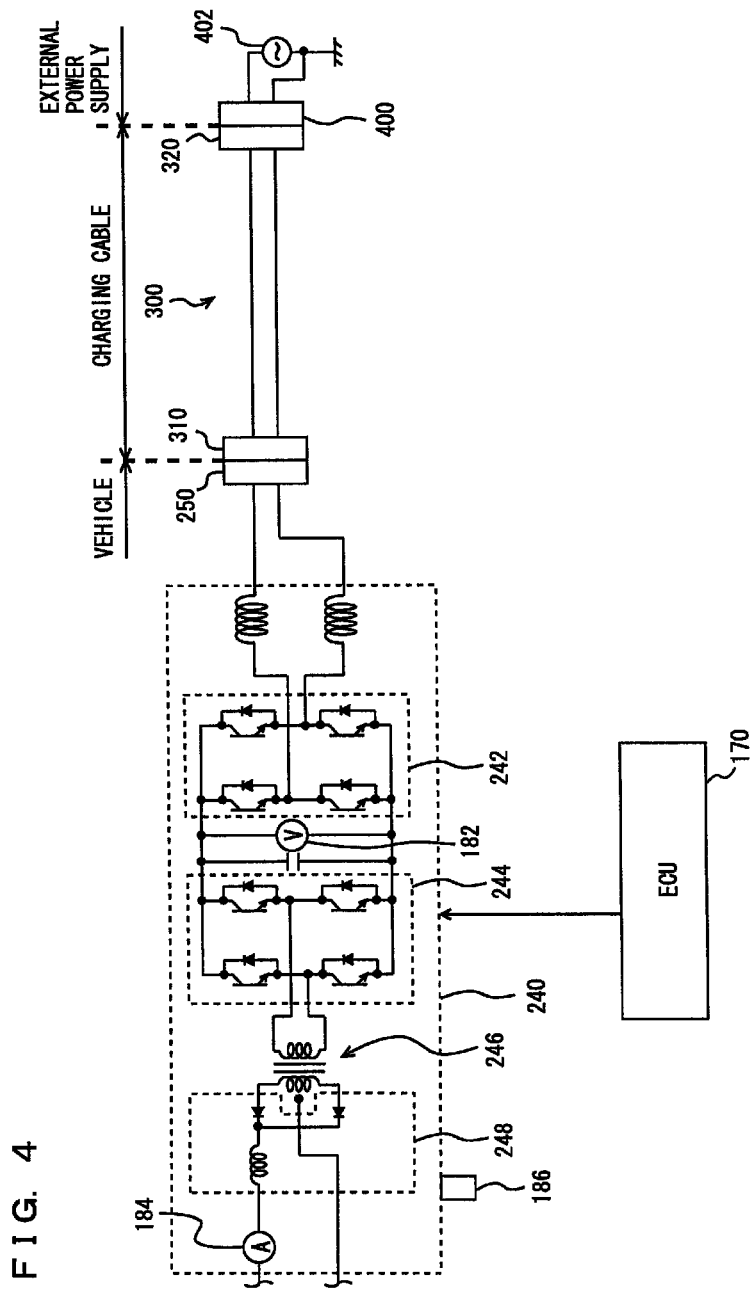
FIG. 4 is a (second) diagram illustrating the electric system of the plug-in hybrid vehicle.

Charger 240 is connected between battery 150 and converter 200. As shown in FIG. 4, charger 240 includes an AC/DC conversion circuit 242, a DC/AC conversion circuit 244, an insulation transformer 246, and a rectifier circuit 248.

AC/DC conversion circuit 242 is formed of a single-phase bridge circuit. AC/DC conversion circuit 242 converts alternating-current power into direct-current power based on a driving signal from ECU 170. AC/DC conversion circuit 242 also serves as a boost chopper circuit that boosts the voltage by using the coils as the reactor.

DC/AC conversion circuit 244 is formed of a single-phase bridge circuit. DC/AC conversion circuit 244 converts direct-current power into high frequency alternating-current power for output to insulation transformer 246, based on a driving signal from ECU 170.

Insulation transformer 246 includes a core made of a magnetic material, and a primary coil and a secondary coil wound around the coil. The primary coil and secondary coil are electrically insulated, and connected to DC/AC conversion circuit 244 and rectifier circuit 248, respectively. Insulation transformer 246 converts the high frequency alternating-current power received from DC/AC conversion circuit 244 to assume a voltage level in accordance with a turn ratio of the primary coil and the secondary coil for output to rectifier circuit 248. Rectifier circuit 248 rectifies the alternating-current power received from insulation transformer 246 into direct-current power.

A voltage between AC/DC conversion circuit 242 and DC/AC conversion circuit 244 (a voltage across terminals of a smoothing capacitor) is detected by a voltage sensor 182, and a signal indicating the detection result is input to ECU 170. An output current from charger 240 is detected by a current sensor 184, and a signal indicating the detection result is input to ECU 170. Further, a temperature of charger 240 is detected by a temperature sensor 186, and a signal indicating the detection result is input to ECU 170.

Inlet 250 is provided on a side face of the plug-in hybrid vehicle, for example. A connector 310 of a charging cable 300 coupling the plug-in hybrid vehicle and an external power supply 402 is connected to inlet 250.

A plug 320 of charging cable 300 is connected to an outlet 400 provided at a house. Alternating-current power is supplied from power supply 402 outside the plug-in hybrid vehicle to outlet 400.

The electric power supplied from external power supply 402 is charged into battery 150 with the plug-in hybrid vehicle and external power supply 402 being coupled to each other by charging cable 300. During charging of battery 150, SMR 230 is closed.

Figure 5:
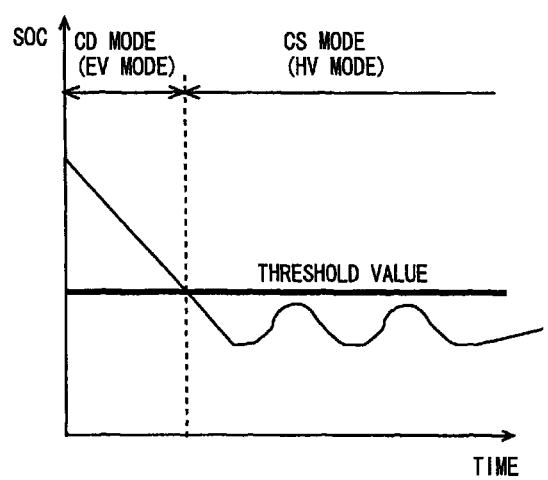
FIG. 5 illustrates an area where a CS mode is selected and an area where a CD mode is selected.

The CS mode and the CD mode will now be described further. As described above, the selection between the CS mode and the CD mode is determined by the driver operating switch 172. The selection between the CS mode and the CD mode may be determined by ECU 170. As shown in FIG. 5, for example, the CS mode may be selected when the SOC of battery 150 is equal to or lower than a threshold value. The CD mode may be selected when the SOC of battery 150 is higher than the threshold value.

More specifically, the CS mode may be selected when the SOC of battery 150 is equal to or lower than the threshold value, or when the electric system of the plug-in hybrid vehicle was stopped last time in the CS mode.

The CD mode may be selected when the SOC of battery 150 is higher than the threshold value, with a history of charging of battery 150 by power supply 402 outside the plug-in hybrid vehicle, or when the SOC of battery 150 is higher than the threshold value, and the electric system of the plug-in hybrid vehicle was stopped last time in the CD mode. Since charging of battery 150 is controlled by ECU 170, the presence or absence of the history of charging of battery 150 by power supply 402 outside the plug-in hybrid vehicle is determined within ECU 170 using a flag, for example. A method of selecting between the CS mode and the CD mode is not limited as such.

In the CS mode and the CD mode, the plug-in hybrid vehicle runs with a driving force from at least one of engine 100 and second motor generator 120.

Figure 6:
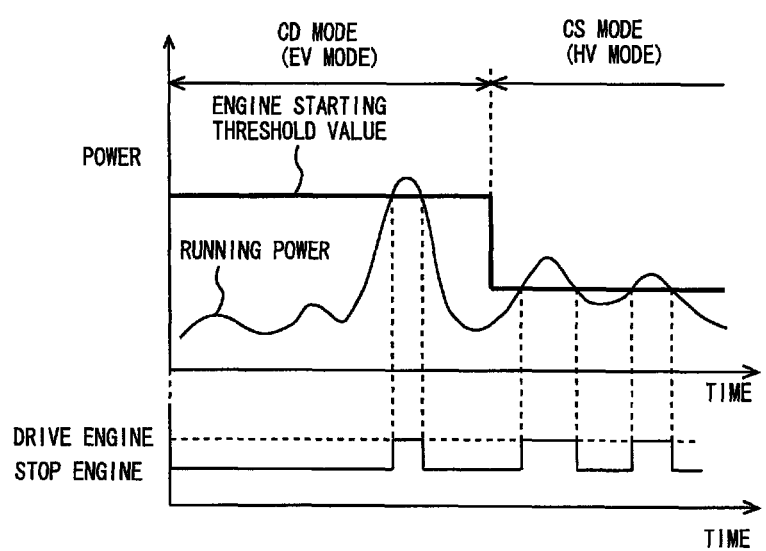
FIG. 6 illustrates a period of time during which an engine is driven.

As shown in FIG. 6, when running power of the plug-in hybrid vehicle is lower than an engine starting threshold value, the plug-in hybrid vehicle runs with only a driving force from second motor generator 120. Thus, when the running power equal to or higher than the engine starting threshold value decreases to the engine starting threshold value, ignition and fuel supply (fuel injection) to engine 100 is stopped in order to stop engine 100.

When the running power of the plug-in hybrid vehicle becomes equal to or higher than the engine starting threshold value, on the other hand, engine 100 is driven. The plug-in hybrid vehicle thus runs with a driving force from engine 100 in addition to or instead of the driving force from second motor generator 120. In addition, electric power generated by first motor generator 110 with the driving force from engine 100 is directly supplied to second motor generator 120.

As is clear from FIG. 6, an area where the plug-in hybrid vehicle is controlled in the CS mode includes an area where engine 100 is stopped and an area where engine 100 is driven. Likewise, an area where the plug-in hybrid vehicle is controlled in the CD mode includes an area where engine 100 is stopped and an area where engine 100 is driven.

The running power is calculated by ECU 170 in accordance with a map having the position of an accelerator pedal operated by the driver (accelerator pedal position), the vehicle speed and the like as parameters, for example. A method of calculating the running power is not limited as such.

In the present embodiment, the running power is used as a parameter of the plug-in hybrid vehicle which is determined in accordance with operation by the driver. Alternatively, the torque, acceleration, driving force, accelerator pedal position and the like may be used as parameters of the plug-in hybrid vehicle.

The engine starting threshold value in the CD mode is higher than the engine starting threshold value in the CS mode. That is, the area where engine 100 is stopped and the plug-in hybrid vehicle runs with only a driving force from second motor generator 120 in the CD mode is larger than the area where engine 100 is stopped and the plug-in hybrid vehicle runs with only a driving force from second motor generator 120 in the CS mode. In the CD mode, therefore, the plug-in hybrid vehicle is controlled such that engine 100 is stopped and the vehicle runs mainly with only a driving force from second motor generator 120. Engine 100 is driven more frequently in the CS mode than in the CD mode. In the CS mode, therefore, the plug-in hybrid vehicle is controlled to run efficiently using both engine 100 and second motor generator 120.

The engine starting threshold value in the CS mode may hereinafter also be referred to as first engine starting power. The engine starting threshold value in the CD mode may also be referred to as second engine starting power. As shown in FIG. 6, the second engine starting power is higher than the first engine starting power.

Electric power charged into battery 150 in the CD mode is lower than electric power charged into battery 150 in the CS mode. Specifically, in the CS mode, the charging power to battery 150 is determined in accordance with the SOC of battery 150. Engine 100 is driven so that electric power corresponding to the determined charging power can be generated with first motor generator 110. In the CD mode, on the other hand, the charging power to battery 150 is usually set to zero. That is, in the CD mode, although electric power obtained by regenerative braking is charged into battery 150, engine 100 is not driven for charging battery 150.

In the CD mode, therefore, the electric power stored in battery 150, particularly the electric power supplied from power supply 402 outside the plug-in hybrid vehicle is actively consumed. Thus, in the CD mode, ignition and fuel supply (fuel injection) to engine 100 may be stopped more frequently than in the CS mode in order to stop engine 100. That is, opportunity for operation of engine 100 is limited in the CD mode compared to in the CS mode.

In the present embodiment, the operation and stopping of engine 100 may be repeated in this manner. As is well known, if engine 100 is stopped when the coolant of engine 100 has a low temperature, a favorable combustion state cannot be obtained when restarting engine 100.

For this reason, in the present embodiment, suspension of engine 100 is allowed only when the coolant of engine 100 has a temperature higher than a prescribed coolant temperature. Engine 100 is stopped if the running power of the plug-in hybrid vehicle becomes lower than the engine starting threshold value when the coolant of engine 100 has a temperature higher than the prescribed coolant temperature.

Figure 7:
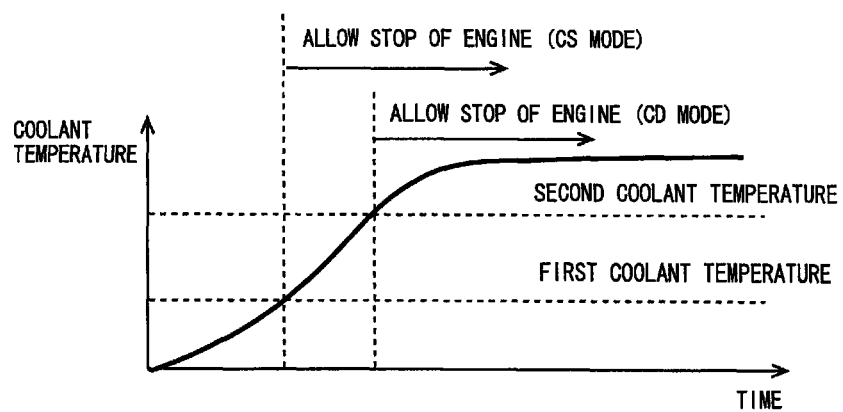
FIG. 7 illustrates a first coolant temperature and a second coolant temperature as lower limit values where stopping of the engine is allowed.

As shown in FIG. 7, in the CS mode, engine 100 is stopped if the running power of the plug-in hybrid vehicle becomes lower than the first engine starting power when the coolant of engine 100 has a temperature higher than a prescribed first coolant temperature.

In the CD mode, on the other hand, engine 100 is stopped if the running power of the plug-in hybrid vehicle becomes lower than the second engine starting power when the coolant of engine 100 has a temperature higher than a prescribed second coolant temperature.

The second coolant temperature is set higher than the first coolant temperature. The first and second coolant temperatures are predetermined by a engineer based on experimental and simulation results and the like.

As is also well known, when engine 100 is started before the completion of warm-up of the engine, a relatively high amount of HC or CO may be exhausted. In order to reduce emissions of HC or CO, the temperature of catalyst 102 is increased to be equal to or higher than the prescribed activating temperature. For example, when engine 100 is started for the first time after activation of the system of the vehicle, in particular ECU 170, engine 100 is warmed up until catalyst 102 has the activating temperature.

Figure 8:
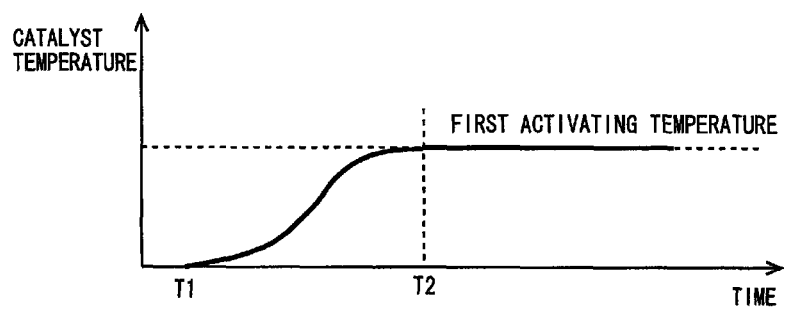
FIG. 8 illustrates a first activating temperature of a catalyst in the CS mode.

As shown in FIG. 8, in the CS mode, the temperature of catalyst 102 is increased to a prescribed first activating temperature. The temperature of catalyst 102 is increased to the first activating temperature by, for example, operating engine 100 and performing catalyst warm-up control including ignition retard of engine 100 during a period between times T1 and T2 in FIG. 7. The first activating temperature is predetermined by the engineer based on experimental and simulation results and the like.

Figure 9:
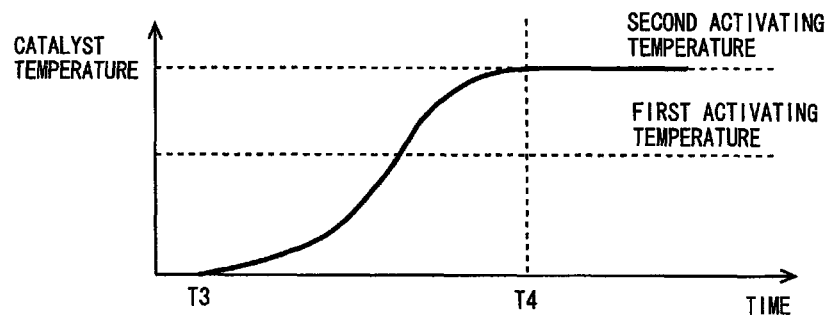
FIG. 9 illustrates a second activating temperature of the catalyst in the CD mode.

As shown in FIG. 9, in the CD mode, on the other hand, the temperature of catalyst 102 is increased to a prescribed second activating temperature. The second activating temperature is set higher than the first activating temperature. The temperature of catalyst 102 is increased to the second activating temperature by, for example, operating engine 100 and performing catalyst warm-up control including ignition retard of engine 100 during a period between times T3 and T4 in FIG. 9.

The temperature of catalyst 102 is detected by a temperature sensor, or estimated based on operating time and a load of engine 100, for example. A method of obtaining the temperature of catalyst 102 may be implemented with well-known common techniques, and therefore, detailed description thereof will not be repeated.

Figure 10:
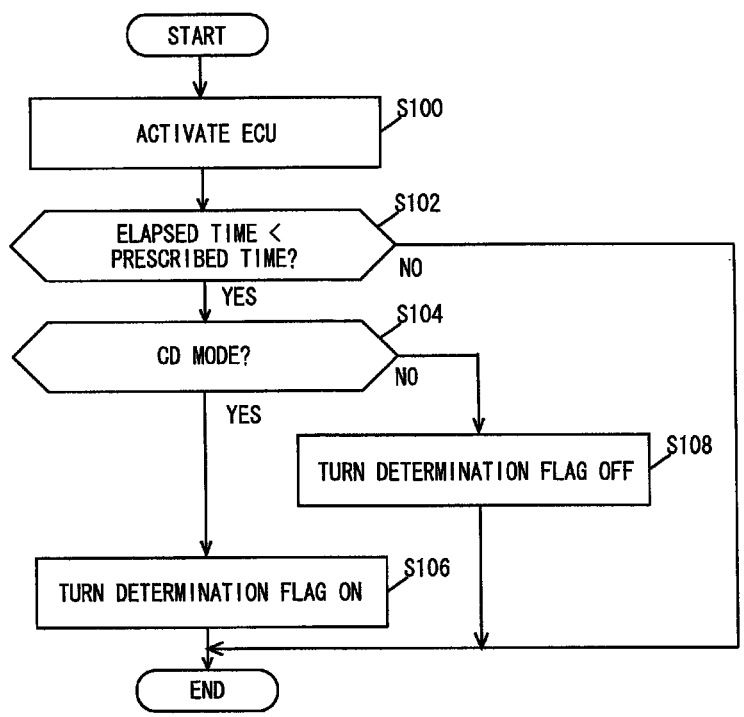
FIG. 10 is a (first) flow chart illustrating a process executed by an ECU.
Figure 11:
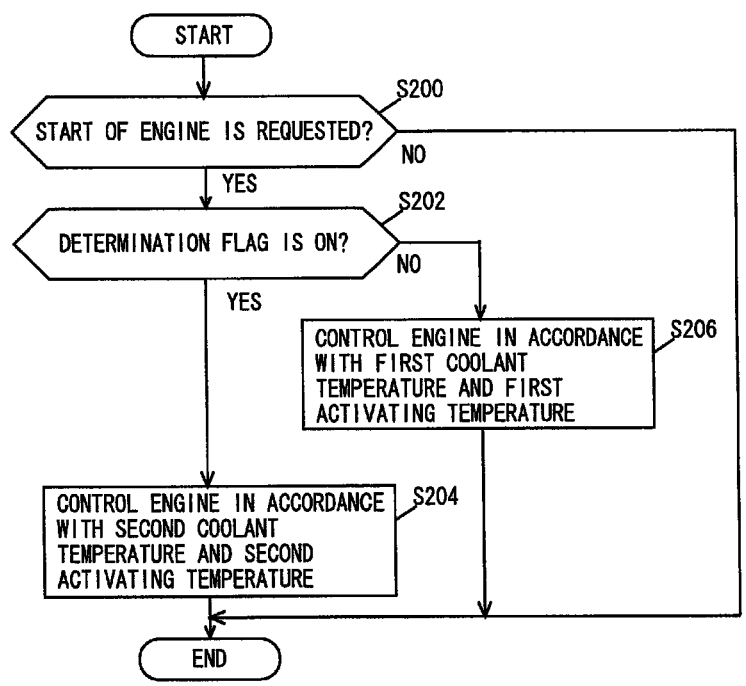
FIG. 11 is a (second) flow chart illustrating the process executed by the ECU.

Referring now to FIGS. 10 and 11, the process executed by ECU 170 will be described. The process to be described below is executed by software, hardware, or cooperation between software and hardware.

Referring to FIG. 10, when ECU 170 is activated in step (hereinafter abbreviated as S) 100, in S102, it is determined whether or not a period of time that has passed since the activation of ECU 170 is shorter than a prescribed period of time. If the period of time that has passed since the activation of ECU 170 is shorter than the prescribed period of time (YES in S102), in S104, it is determined whether or not the CD mode has been selected.

If the CD mode has been selected (YES in S104), in S106, a determination flag is turned on. The determination flag being ON indicates that the vehicle has been controlled in the CD mode since the point in time when ECU 170 was activated. If the CD mode has not been selected (NO in S104), in S108, the determination flag is turned off.

Referring to FIG. 11, in S200, it is determined whether or not the start of engine 100 is requested. That is, it is determined whether or not the running power of the plug-in hybrid vehicle is equal to or higher than the engine starting threshold value. For example, it is determined whether or not the start of engine 100 is requested for the first time after the activation of ECU 170.

Figure 12:
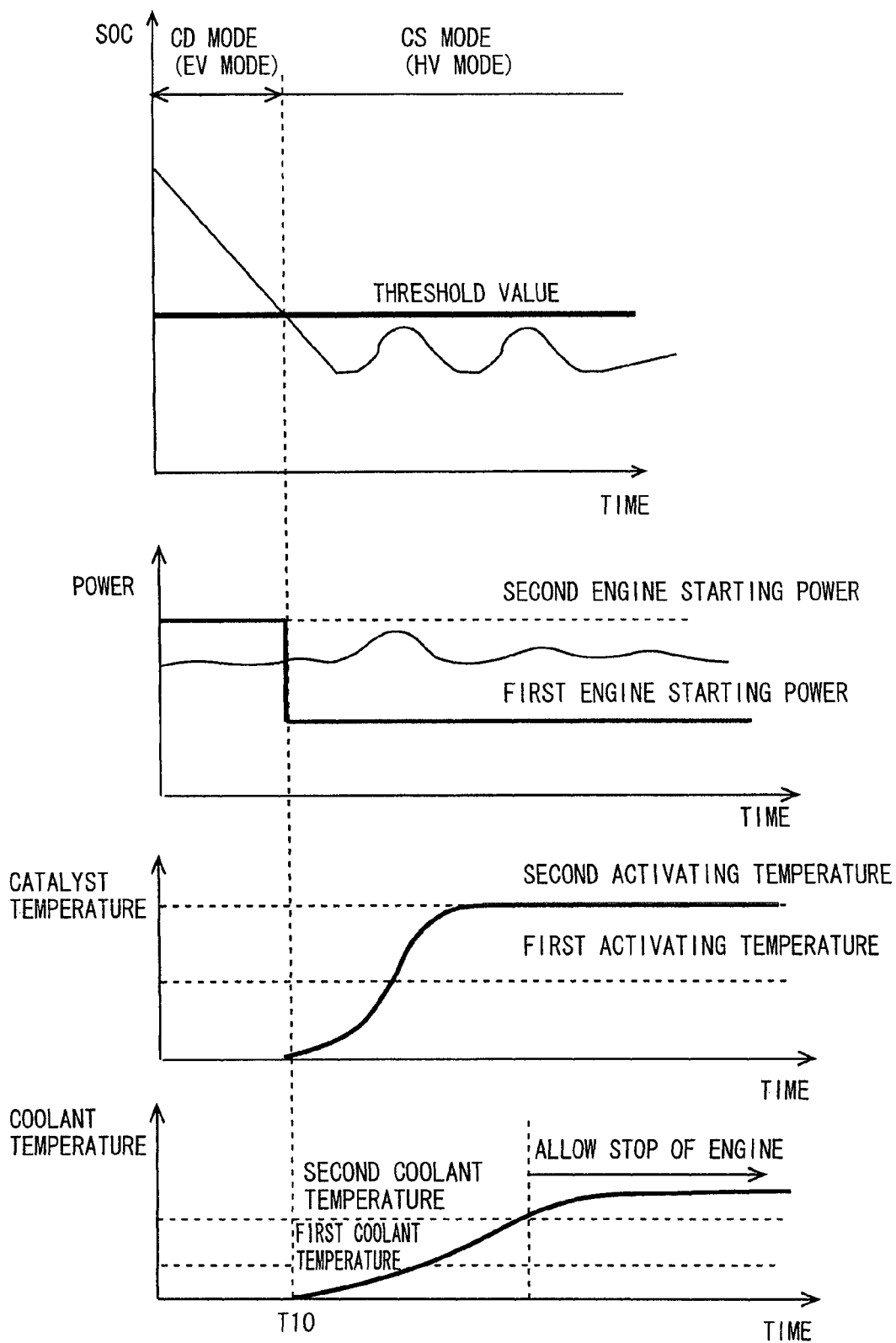
FIG. 12 illustrates a state of charge of a battery and running power of the plug-in hybrid vehicle.

By way of example, as shown in FIG. 12, when the state of charge of battery 150 decreases while the vehicle is controlled in the CD mode, and the control mode is changed from the CD mode to the CS mode at time T10, with the running power of the plug-in hybrid vehicle being equal to or higher than the first engine starting power, the start of engine 100 is requested.

If the start of engine 100 is requested (YES in S200), in S202, it is determined whether or not the determination flag is ON. If the determination flag is OFF (NO in S202), in S206, engine 100 is controlled in accordance with conditions used to control engine 100 in the CS mode.

Specifically, the catalyst warm-up control is performed until the temperature of catalyst 102 reaches the prescribed first activating temperature. If the temperature of the coolant of engine 100 is higher than the prescribed first coolant temperature, the suspension of engine 100 is allowed. That is, engine 100 is stopped if the running power of the plug-in hybrid vehicle becomes lower than the first engine starting power when the temperature of the coolant of engine 100 is higher than the prescribed first coolant temperature.

If the determination flag is ON (YES in S202), on the other hand, in S204, engine 100 is controlled in accordance with conditions different from the conditions used to control engine 100 in the CS mode.

Specifically, engine 100 is controlled with conditions used to control engine 100 in the CD mode. Thus, the catalyst warm-up control is performed until the temperature of catalyst 102 reaches the prescribed second activating temperature. If the temperature of the coolant of engine 100 is higher than the prescribed second coolant temperature, the suspension of engine 100 is allowed. That is, engine 100 is stopped if the running power of the plug-in hybrid vehicle becomes lower than the first engine starting power when the temperature of the coolant of engine 100 is higher than the prescribed second coolant temperature. The first engine starting power used in the CS mode is employed as the engine starting threshold value. In this case, it can be said that engine 100 is controlled in a third control mode, which is different from the CD mode and the CS mode and is a combination of the CD mode and the CS mode.

As such, in the present embodiment, if engine 100 is started when the vehicle has been controlled in the CD mode since the point in time when ECU 170 was activated, engine 100 is controlled in accordance with the second activating temperature and the second coolant temperature used in the CD mode.

Thus, as shown in FIG. 12, if engine 100 is started when the state of charge of battery 150 decreases while the vehicle is controlled in the CD mode, and the control mode is changed from the CD mode to the CS mode at time T10, with the running power of the plug-in hybrid vehicle being equal to or higher than the first engine starting power, engine 100 is controlled in accordance with the second activating temperature and the second coolant temperature different from the first activating temperature and the first coolant temperature used in the CS mode. That is, the prescribed threshold value used in the CS mode is changed.

Accordingly, the temperature of catalyst 102 is prevented from remaining low, and the temperature of the coolant of engine 100 is prevented from remaining low. Therefore, catalyst 102 can perform the warm-up function sufficiently, and a favorable combustion state in engine 100 can be obtained. As a result, unpurified components contained in exhaust gas can be reduced.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

Reference Signs List 100 engine; 102 catalyst; 106 temperature sensor; 110 first motor generator; 120 second motor generator; 130 power split device; 140 reduction gear; 150 battery; 160 front wheel; 170 ECU

The invention claimed is:

1. A hybrid vehicle comprising:
   an engine;
   a power storage device;
   an electric motor to generate a vehicle driving force by being supplied with an electric power from said power storage device; and
   a control unit programmed to control said hybrid vehicle in one of a CS (Charge Sustaining) mode and a CD (Charge Depleting) mode, wherein
   each of said CD mode and said CS mode has both a state in which said engine is driven and a state in which said engine is stopped,
   wherein said control unit controls the hybrid vehicle in said CS mode using either:
   a first condition for permitting a suspension of said engine which is already started, in a case where said engine is started after said hybrid vehicle is switched to be controlled in said CS mode due to decrease in a state of charge of said power storage device while said hybrid vehicle is controlled in said CD control mode, or
   a second condition for permitting the suspension of said engine, in a case where said engine is started while said hybrid vehicle is controlled in said CS control mode since a point in time when said control unit was activated, and said first condition is set such that it is more difficult to suspend the engine which is already started, compared with said second condition.

2. The hybrid vehicle according to claim 1, further comprising a catalyst to purify gas exhausted from said engine, wherein said control unit warms up said catalyst until a temperature of said catalyst attains a first value and permits the suspension of said engine when said temperature of said catalyst attains said first value, in a case where said second condition is applied, and warms up said catalyst until the temperature of said catalyst attains a second value higher than said first value and permits the suspension of said engine when said temperature of said catalyst attains said second value, in a case where said first condition is applied.

3. The hybrid vehicle according to claim 1, wherein
said control unit permits the suspension of said engine with a temperature of coolant of said engine being higher than a first value, in a case where said second condition is applied, and permits the suspension of said engine with the temperature of the coolant of said engine being higher than a second value higher than said first value, in a case where said first condition is applied.

4. The hybrid vehicle according to claim 1, wherein
the suspension of said engine is permitted in accordance with said first condition, in a case where said hybrid vehicle is controlled in said CD mode since a point in time when said control unit was activated, and said engine is started after said hybrid vehicle is switched to be controlled in said CS mode due to the decrease in the state of charge of said power storage device while said vehicle is controlled in said CD mode.

5. The hybrid vehicle according to claim 1, wherein
said control unit turns a flag ON when said hybrid vehicle has been controlled in said CD mode since a point in time when said control unit was activated,
in said CS mode, the suspension of said engine is permitted in accordance with said first condition in a case where said engine is started with said flag being ON, and, the suspension of said engine is permitted in accordance with said second condition in a case where said engine is started with said flag being OFF.

6. The hybrid vehicle according to claim 1, wherein
said control unit controls said hybrid vehicle in said CS mode when the state of charge of said power storage device is lower than a threshold value, and controls said hybrid vehicle in said CD mode when the state of charge of said power storage device is equal to or higher than said threshold value.

7. The hybrid vehicle according to claim 1, wherein
said control unit starts said engine when a vehicle power exceeds a first threshold value in said CD mode, and starts said engine when the vehicle power exceeds a second threshold value in said CS mode, and said first threshold value is larger than said second threshold value.

8. A method of controlling a hybrid vehicle including an engine , a power storage device and an electric motor to generate a vehicle driving force by being supplied with an electric power from said power storage device comprising the steps of:

controlling, by a control unit, said hybrid vehicle in one of a CS (Charge Sustaining) mode and a CD (Charge Depleting) mode; and controlling in the CS mode, by the control unit, said engine in a first condition or a second condition:

wherein the first condition permits a suspension of said engine which is already started, in a case where said engine is started after said hybrid vehicle is switched to be controlled in said CS mode due to decrease in a state of charge of said power storage device while said hybrid vehicle is controlled in said CD control mode, wherein the second condition permits the suspension of said engine, in a case where said engine is started while said hybrid vehicle is controlled in said CS control mode since a point in time when said control unit was activated, wherein each of said CD mode and said CS mode has both a state in which said engine is driven and a state in which said engine is stopped, and said first condition is set such that it is more difficult to suspend the engine which is already started, compared with said second condition.

9. A device of controlling an engine incorporated in a hybrid vehicle provided with a power storage device and an electric motor to generate a vehicle driving force by being supplied with an electric power from said power storage device, comprising:

means for controlling said hybrid vehicle in one of a CS (Charge Sustaining) mode and a CD (Charge Depleting) mode and means for controlling said engine in said CS mode in a first condition or a second condition, wherein the first condition permits a suspension of said engine which is already started, in a case where said engine is started after said hybrid vehicle is switched to be controlled in said CS mode due to decrease in a state of charge of said power storage device while said hybrid vehicle is controlled in said CD control mode, wherein the second condition permits the suspension of said engine, in a case where said engine is started while said hybrid vehicle is controlled in said CS control mode since a point in time when said control unit was activated, wherein each of said CD mode and said CS mode has both a state in which said engine is driven and a state in which said engine is stopped, and said first condition is set such that it is more difficult to suspend the engine which is already started, compared with said second condition.

* * * * *